(12) United States Patent
Eichenlaub et al.

(10) Patent No.: US 10,275,487 B2
(45) Date of Patent: Apr. 30, 2019

(54) DEMOGRAPHIC-BASED LEARNING IN A QUESTION ANSWERING SYSTEM

(71) Applicant: International Business Machines Corporation, Armonk, NY (US)

(72) Inventors: Anthony W. Eichenlaub, Rochester, MN (US); Cynthia M. Murch, Pine Island, MN (US); Terrence T. Nixa, Rochester, MN (US); Jan M. Nordland, Hayfield, MN (US); John E. Petri, St. Charles, MN (US); Michelle A. Schlicht, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 470 days.

(21) Appl. No.: 14/734,481

(22) Filed: Jun. 9, 2015

(65) Prior Publication Data

US 2016/0364391 A1    Dec. 15, 2016

(51) Int. Cl.
| | | |
|---|---|---|
| *G06F 17/30* | (2006.01) | |
| *G06F 17/27* | (2006.01) | |
| *G06F 17/28* | (2006.01) | |
| *G06N 99/00* | (2019.01) | |
| *G06N 5/04* | (2006.01) | |

(52) U.S. Cl.
CPC ...... *G06F 17/3043* (2013.01); *G06F 17/2785* (2013.01); *G06F 17/2881* (2013.01); *G06F 17/30401* (2013.01); *G06F 17/30542* (2013.01); *G06F 17/30867* (2013.01); *G06N 5/04* (2013.01); *G06N 99/005* (2013.01)

(58) Field of Classification Search
CPC .................. G06F 17/3043; G06F 17/30401
USPC .......................................................... 707/780
See application file for complete search history.

(56) References Cited

U.S. PATENT DOCUMENTS

| | | | | |
|---|---|---|---|---|
| 4,408,616 A | * | 10/1983 | Duffy | A61B 5/0484 600/544 |
| 6,064,971 A | * | 5/2000 | Hartnett | G06Q 99/00 706/45 |
| 6,285,993 B1 | * | 9/2001 | Ferrell | G09B 7/04 434/322 |
| 8,838,015 B2 | | 9/2014 | Packard et al. | |
| 2004/0210661 A1 | * | 10/2004 | Thompson | G06Q 30/02 709/228 |
| 2007/0118394 A1 | * | 5/2007 | Cahoon | G06Q 30/02 705/1.1 |
| 2007/0168413 A1 | * | 7/2007 | Barletta | G06F 3/04883 709/203 |
| 2007/0219863 A1 | * | 9/2007 | Park | G06Q 10/10 705/14.11 |

(Continued)

OTHER PUBLICATIONS

Beck et al., "Applications of AI in Education," Crossroads The ACM Student Magazine, vol. 3, Issue 1, pp. 1-15, Sep. 1996, ACM New York, NY, USA, DOI: 10.1145/332148.332153.

(Continued)

*Primary Examiner* — Mark E Hershley
(74) *Attorney, Agent, or Firm* — Jared L. Montanaro

(57) ABSTRACT

A first question may be received. A first tag may be identified. The first tag may correspond to a first demographic trait. The first tag may be for use in providing a context for generating a first answer estimate to the first question. The first answer estimate may be generated using natural language processing and based on the first tag.

14 Claims, 5 Drawing Sheets

(56) References Cited

U.S. PATENT DOCUMENTS

| | | |
|---|---|---|
| 2008/0220399 A1 | 9/2008 | Giwa |
| 2009/0070311 A1* | 3/2009 | Feng ................. G06F 17/30654 |
| 2011/0302117 A1* | 12/2011 | Pinckney ............... G06Q 30/02 706/12 |
| 2011/0307478 A1* | 12/2011 | Pinckney ............. G06N 99/005 707/724 |
| 2012/0110515 A1* | 5/2012 | Abramoff ......... G06F 17/30994 715/854 |
| 2012/0282578 A1* | 11/2012 | Chapman ................. G09B 7/04 434/178 |
| 2013/0124449 A1* | 5/2013 | Pinckney .......... G06F 17/30867 706/52 |
| 2013/0275120 A1* | 10/2013 | DeGross ................. G06F 17/28 704/9 |
| 2014/0099623 A1* | 4/2014 | Amit ........................ G09B 7/00 434/350 |
| 2014/0329565 A1* | 11/2014 | Mannix ............. H04M 1/72569 455/566 |
| 2014/0356845 A1* | 12/2014 | Huber ...................... G09B 5/08 434/362 |
| 2014/0370488 A1* | 12/2014 | Kapoor .................... G09B 7/02 434/362 |
| 2015/0170536 A1* | 6/2015 | Lan .......................... G09B 7/02 434/350 |
| 2015/0207766 A1* | 7/2015 | Lindner .................. H04L 51/06 709/206 |
| 2015/0254785 A1* | 9/2015 | Yang ...................... G06N 7/005 705/26.41 |

OTHER PUBLICATIONS

Corley et al., "Chapter 18: Predicting Individual Affect of Health Interventions to Reduce HPV Prevalence," Software Tools and Algorithms for Biological Systems, Advances in Experimental Medicine and Biology 696, Copyright Springer Science+Business Media, LLC 2011, pp. 181-190, DOI: 10.1007/978-1-4419-7046-6_18.

Maymir-Ducharme et al., "Cognitive Analytics: A Step Towards Tacit Knowledge?", Systemics, Cybernetics, and Informatics, vol. 12, No. 4, 2014, pp. 32-38, ISSN: 1690-4524.

Nimita et al., "The Modern Social Contract between the Patient, the Healthcare Provider, and Digital Medicine," Socialomics, vol. 3, Issue 1, Jan. 30, 2014, pp. 1-6, ISSN: 2167-0358, DOI: 10.4172/2167-0358.1000105.

Wells et al., "The ALFA Project: Research into an Innovative Secondary Education Initiative," © 2010, pp. 1-46, The ALFA Project, Co. Clare, Ireland.

* cited by examiner

```
Question: What is your highest priority in life?
QA system (4-year-olds): toys
QA system (12-year-olds: video games
QA system (17-year-olds): friends
QA system (30-year-old midwestern): family
QA system (30-year-old west coast):  career and relationships
QA system (30-year-old southern): family and faith OBSERVATION: priorities are people-based starting at age 17; 30-year-old
midwestern and/or 30-year-old southern versus 30-year-old west coast.

TAGS: Age and Location
```

FIG. 5

```
Question: Germs are...
        (A) a yummy snack (B) organisms that are so small they can only be seen by a
            microscope (C) bugs (D) a vegetable
```

FIG. 6

DEMOGRAPHIC-BASED LEARNING IN A QUESTION ANSWERING SYSTEM

BACKGROUND

The present disclosure relates to question answering (QA) systems, and more specifically to demographic-based learning in a question answering system.

Recent research has been directed to developing question answering (QA) systems designed to receive input questions, analyze them, and return applicable answers or answer estimates. These systems may rely on natural language processing, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis generation, scoring, and ranking in order to determine a final set of one or more output answers.

SUMMARY

According to embodiments of the present disclosure, aspects of the disclosure may include a method, a system, and a computer program product. A first question may be received. A first tag may be identified. The first tag may correspond to a first demographic trait. The first tag may be for use in providing a context for generating a first answer estimate to the first question. The first answer estimate may be generated using natural language processing and based on the first tag.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 5 is an example screen shot of a QA system question and demographic-based answer estimates, according to embodiments.

FIG. 6 is an example of a particular question that may be fed to the QA system, according to embodiments.

Figure 1:
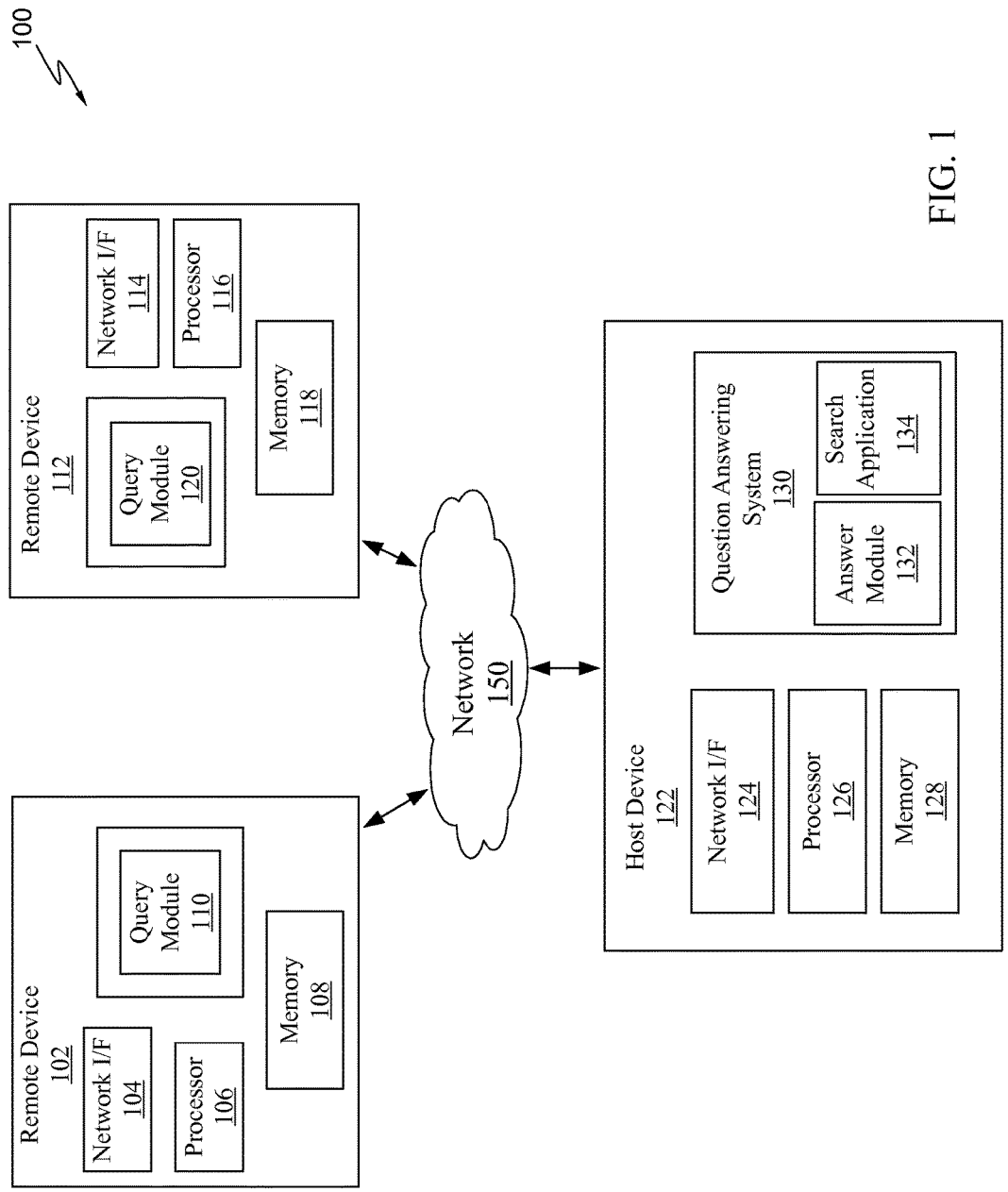
FIG. 1 illustrates a block diagram of an example computing environment for use with a question answering (QA) system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to demographic-based learning in question answering (QA) systems. While the present disclosure is not necessarily limited to such applications, various aspects of the disclosure may be appreciated through a discussion of various examples using this context. Furthermore, it is contemplated that some embodiments may use or take the form of computer systems that may not be question answering systems.

People learn and develop conventions in a variety of different manners. In some cases, this is due to various demographic traits associated with a person (e.g., the person's age, culture, gender, socioeconomic status, religion, political ideology, etc.). For example, a group of people raised in a first region may generally exhibit visual artistic tendencies (e.g., an affinity for painting), while a group of people raised in a second region may generally exhibit an affinity for literature. These and other observations may be useful for social scientists and other researchers to understand human demographics and how demographics can be used to help society. Using the illustration above, if researchers confirmed an association between the group in the first region and visual artistic tendencies, policies or curriculums may be implemented in schools of the first region that are based on learning by drawing, pictures, painting, etc.

Currently, in order for researchers to test or form demographic-based hypotheses, researchers may engage in the lengthy process of obtaining a pool of potential human participants, choosing qualified participants (which may include determining that the participants are not associated with a confounding variable that may bias results), and asking the participants various questions. The researchers may also use analytics software tools (e.g., Statistical Package for the Social Sciences (SPSS)) to perform various statistical analyses. This entire process of generating qualified participants, forming and testing a hypothesis, and using analytics tools may be costly both in terms of money and the time it takes to produce sufficient results. Accordingly, embodiments of the present disclosure are directed towards a QA system that researchers may use to test or form their demographic-based hypotheses without the need of gathering human subjects, which may save time and money. Moreover, the QA system may allow the researcher to perform various complex analytical observations in a rapid manner. In embodiments, the QA system may receive a first question (e.g., a research question to form a hypothesis) and identify a first tag that corresponds with a demographic trait. The demographic tags are for use in providing a context to generate a first answer estimate to the first question. An answer estimate as described herein may mean that an answer to a question is predicted based on a particular tag (e.g., demographic trait). For example, a question may be presented to the QA system such as "what is the most important priority in your life?" The selected tags may be "age." As described in more detail below, the QA system may predict how a 5-year-old would answer this question (e.g., toys) versus how a 40-year-old would answer the question (e.g., family and career). In some embodiments, the QA system may provide an answer estimate based on percentages (e.g., "80% of age X would get the correct answer"). Alternatively, the QA system may give a free-standing answer to the question along with a confidence score. For example, the answer estimate to the question of "what is 9 times 9?" may be: "(5-year-olds) 18 (confidence interval (CI)=85%), "(20-year-olds) 81 (CI=95%))".

FIG. 1 is a block diagram of an example computing environment 100 for use with a question answering system, consistent with embodiments of the present disclosure. In some embodiments, the computing environment 100 may include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, intranet, etc.). Alternatively, remote devices 102, 112 and host devices 122 may be local to each other, and communicate via any appropriate local communication medium (e.g., local area network (LAN), hardwire, wireless link, intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 150.

In some embodiments, host device 122 may include a question answering system 130 having a search application 134 and an answer module 132. The search application 134 may be implemented by a conventional or other search engine, and may be distributed across multiple computer systems. The search application 134 may be configured to search one or more databases or other computer systems for content that is related to a question input by a user at a remote device 102, 112.

In some embodiments, remote devices 102, 112 may enable users to submit questions (e.g., search requests, potential research questions, or other user queries) to host devices 122 to retrieve search results. For example, the remote devices 102, 112 may include a query module 110, 120 (e.g., in the form of a web browser or any other suitable software module) and present a graphical user interface or other interface (e.g., command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, natural language processing software, search engine and/or web crawling software, filter modules for filtering content based upon predefined criteria, etc.). In some embodiments, the computer systems may include servers, desktops, laptops, and hand-held devices. In addition, the answer module 132 may include one or more modules or units to perform the various functions of embodiments as described below (e.g., receiving a first question, identifying a first tag (corresponding to a demographic trait), generating a first answer estimate, etc.) and may be implemented by any combination of any quantity of software and/or hardware modules or units.

Figure 2:
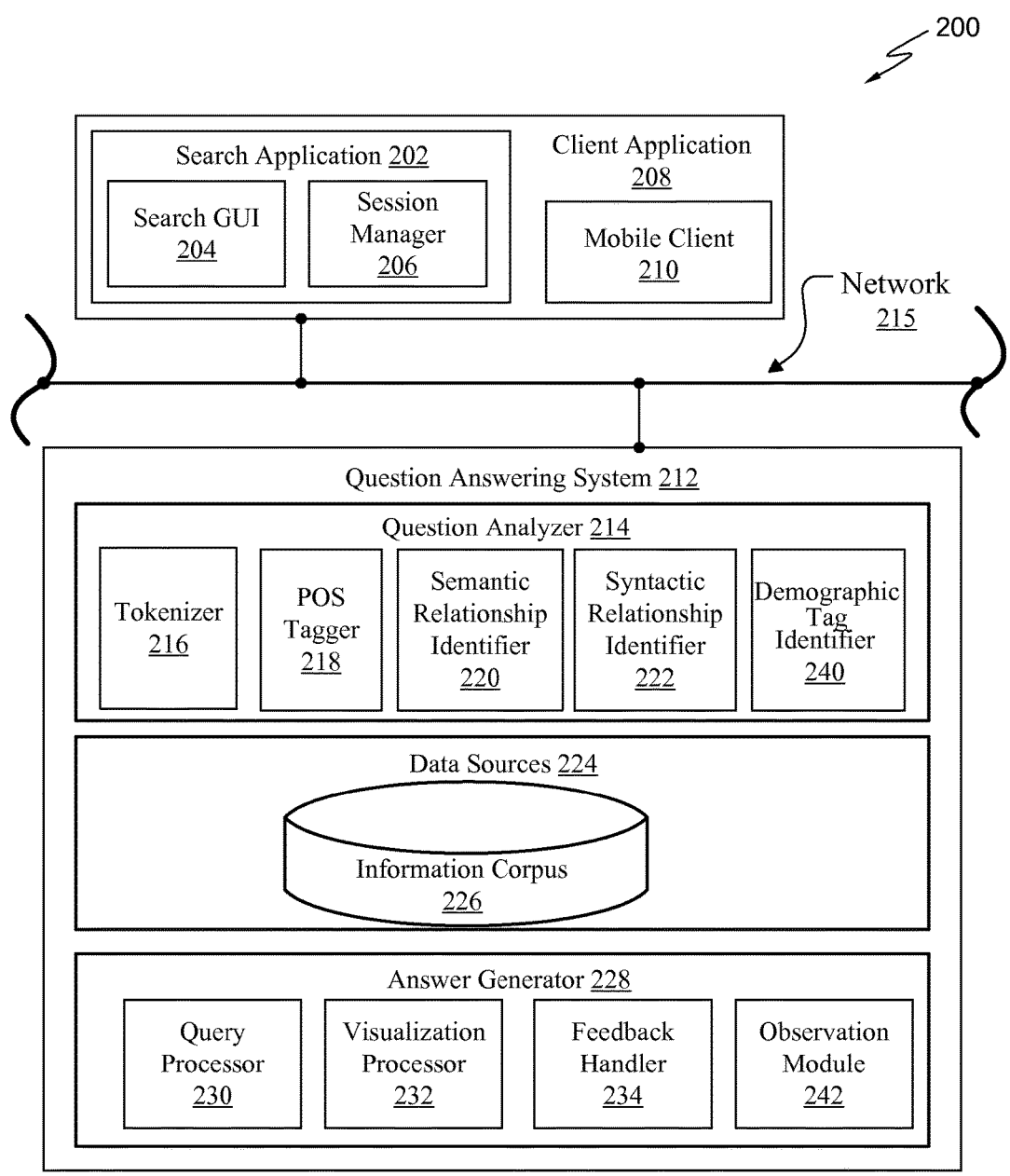
FIG. 2 illustrates a block diagram of an example QA system usable to generate answer estimates to one or more questions, consistent with embodiments of the present disclosure.

FIG. 2 is a block diagram of an example question answering system usable to generate answers to one or more questions, consistent with embodiments of the present disclosure. Aspects of FIG. 2 are directed toward an exemplary system architecture 200, including a question answering system 212 to generate answer estimates to user queries (e.g., user's questions). In some embodiments, one or more users can send requests for information to QA system 212 using a remote device (such as remote devices 102, 112 of FIG. 1). Such a remote device may include a client application 208 which may itself involve one or more entities operable to generate information that is then dispatched to QA system 212 via network 215. QA system 212 may be able to perform methods and techniques for responding to the requests sent by the client application 208. In some embodiments, the information received at QA system 212 may correspond to input questions received from users, where the input questions may be expressed in a free form and in natural language.

A question (similarly referred to herein as a user query) may be one or more words that form a search term or request for data, information, or knowledge. A question may be expressed in the form of one or more keywords. Questions may include various selection criteria and search terms. A question may be composed of complex linguistic features in addition to keywords. However, a keyword-based search for answers may also be possible. In some embodiments, using restricted syntax for questions posed by users may be enabled. The use of restricted syntax may result in a variety of alternative expressions that assist users in better stating their needs.

Consistent with various embodiments, client application 208 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by QA system 212. In some embodiments, client application 208 may include one or more components, such as a mobile client 210. Mobile client 210, acting as an agent of client application 208, may dispatch user query requests to QA system 212.

Consistent with various embodiments, client application 208 may also include a search application 202, either as part of mobile client 210 or separately, that may perform several functions, including some or all of the above functions of mobile client 210 listed above. For example, in some embodiments, search application 202 may dispatch requests for information to QA system 212. In some embodiments, search application 202 may be a client application to QA system 212. Search application 202 may send requests for answer estimates to QA system 212. Search application 202 may be installed on a personal computer, a server, or other computer system.

In some embodiments, search application 202 may include a search graphical user interface (GUI) 204 and session manager 206. In such situations, users may be able to enter questions in search GUI 204. In some embodiments, search GUI 204 may be a search box or other GUI component, the content of which can represent a question to be submitted to QA system 212. Users may authenticate to QA system 212 via session manager 206. In some embodiments, session manager 206 may keep track of user activity across sessions of interaction with the QA system 212. Session manager 206 may also keep track of what questions are submitted within the lifecycle of a session of a user. For example, session manager 206 may retain a succession of questions posed by a user during a session. In some embodiments, answers or answer estimates produced by QA system 212 in response to questions posed throughout the course of a user session may also be retained. Information for sessions managed by session manager 206 may be shared between computer systems and devices.

In some embodiments, client application 208 and QA system 212 may be communicatively coupled through network 215, e.g., the Internet, intranet, or other public or private computer network. In some embodiments, QA system 212 and client application 208 may communicate by using Hypertext Transfer Protocol (HTTP), Representational State Transfer (REST) calls, or any other suitable protocol. In some embodiments, QA system 212 may reside on a server node. Client application 208 may establish server-client communication with QA system 212 or vice versa. In some embodiments, the network 215 can be implemented within a cloud computing environment, or using one or more cloud computing services.

Consistent with various embodiments, QA system 212 may respond to the requests for information sent by client applications 208 (e.g., questions posed by users). QA system 212 may generate answer estimates to the received questions. In some embodiments, QA system 212 may include a question analyzer 214, data sources 224, and answer generator 228. Question analyzer 214 may be a computer module (e.g., Natural Language Processing (NLP) module) that analyzes the received questions. Question analyzer 214 may perform various methods and techniques for analyzing structured data (e.g., data from databases), unstructured data (e.g., data from a web page), and/or multimedia (e.g., images, audio, video, etc.). For example, the question analyzer 214 may utilize syntactic analysis and semantic analysis, as described below. In some embodiments, question analyzer 214 parses passages of documents. Question analyzer 214 may include various modules to perform analyses of received questions. For example, computer modules that question analyzer 214 may encompass, but are not limited to, may include a tokenizer 216, a part-of-speech (POS) tagger 218, a semantic relationship identifier 220, a syntactic relationship identifier 222, and a demographic tag identifier 240.

In some embodiments, tokenizer 216 may be a computer module that performs lexical analysis. Tokenizer 216 may convert a sequence of characters into a sequence of tokens. A token may be a string of characters included in an electronic document and categorized as a meaningful symbol. Further, in some embodiments, tokenizer 216 may identify word boundaries in an electronic document and break any text passages within the document into their component text elements, such as words, multiword tokens, numbers, and punctuation marks. In some embodiments, tokenizer 216 may receive a string of characters, identify the lexemes in the string, and categorize them into tokens.

Consistent with various embodiments, POS tagger 218 may be a computer module that marks up a word in passages to correspond to a particular part of speech. POS tagger 218 may read a passage or other text in natural language and assign a part of speech to each word or other token. POS tagger 218 may determine the part of speech to which a word (or other text element) corresponds based on the definition of the word and the context of the word. The context of a word may be based on its relationship with adjacent and related words in a phrase, sentence, question, or paragraph. In some embodiments, the context of a word may be dependent on one or more previously analyzed electronic documents (e.g., the content of one source document may shed light on the meaning of text elements in another source document). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a passage with part of speech categories. In some embodiments, POS tagger 218 may tag tokens or words of a passage to be parsed by the question answering system 212.

In some embodiments, semantic relationship identifier 220 may be a computer module that may identify semantic relationships of recognized text elements (e.g., words, phrases) in documents. In some embodiments, semantic relationship identifier 220 may determine functional dependencies between entities and other semantic relationships.

Consistent with various embodiments, syntactic relationship identifier 222 may be a computer module that may identify syntactic relationships in a passage composed of tokens. Syntactic relationship identifier 222 may determine the grammatical structure of sentences, for example, which groups of words are associated as phrases and which word is the subject or object of a verb. Syntactic relationship identifier 222 may conform to formal grammar.

According to various embodiments, the demographic tag identifier 240 may be a computer module that identifies and analyzes one or more tags associated with demographic traits that are specified by a user. The demographic traits may be for use in providing a context to generate an answer estimate to a question. For example, a user may input into the search application 202 the question of "what is the most important priority in life?" The user may also input into the search application demographic trait tags such as "age". The demographic tag analyzer 240 may then identify the demographic tag trait of "age" and analyze the data sources 224 such that the answer generator 228 may retrieve appropriate answer estimates to the question according to the demographic tags.

In some embodiments, question analyzer 214 may be a computer module that can parse a received user query and generate a corresponding data structure of the user query. For example, in response to receiving a question at QA system 212, question analyzer 214 may output the parsed question as a data structure. In some embodiments, the parsed question may be represented in the form of a parse tree or other graph structure. To generate the parsed question, question analyzer 214 may trigger computer modules 216, 218, 220, 222, and 240. Additionally, in some embodiments, question analyzer 214 may use external computer systems for dedicated tasks that are part of the question parsing process.

In some embodiments, answer generator 228 may be a computer module that generates answer estimates to posed questions. Examples of answer estimates generated by answer generator 228 may include, but are not limited to, answers in the form of natural language sentences; reports, charts, or other analytic representation; raw data; web pages; and the like.

In some embodiments, the output of the question analyzer 214 may be used by search application 202 to perform a search of a set of (i.e., one or more) corpora to retrieve one or more candidate answer estimates to link to received questions As used herein, a corpus may refer to one or more data sources. In an example illustration, if a user proposed a demographic-based question via the search application 202 in order to form a hypothesis, the target documents utilized to answer the question may include data gathered from scientific articles, newspaper articles, books, videos, questionnaires, etc. In an illustrative example, a researcher may pose a question that reads "what is the most important priority of life?" The researcher may then be interested in how people in a first region are likely to answer this question, and how people in a second region are likely answer this question based on age. Accordingly, the demographic traits may be "age" and "region 1, region 2." In order to generate appropriate answer estimates, after the demographic tag identifier 240 identifies the tags (age, region 1, and region 2), the answer generator 228 may locate within the data sources 224 a study (or questionnaire) that shows that children under 5 have an affinity toward toys more than anything. Moreover, a blog (or a newspaper) generated by various people in the first region may indicate that the people in that region show an affinity towards family and faith. Accordingly, the answer generator 228 may generate an answer estimate (e.g., 5 year old kids' highest priority, regardless of region, is toys) to this question based on the tags and the documents found within the information corpus 226. In other embodiments, researchers may recruit live participants and perform a standard research study such that the researcher may input the results into the QA system 212. This may be useful for future questions a researcher may have that are iterations of previous questions or studies.

In some embodiments, data sources 224 may include data warehouses, information corpora, data models, multimedia, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of potential target documents. The data may be sourced from various operational systems. Data stored in the information corpus 226 may be structured in a way to specifically address reporting and analytic requirements. In some embodiments, the information corpus may be a relational database.

Consistent with various embodiments, answer generator 228 may include query processor 230, visualization processor 232, and feedback handler 234. When information in a data source 224 matching a parsed question is located, a technical query can be executed by query processor 230. Based on data retrieved by a technical query executed by query processor 230, visualization processor 232 may be able to render visualization of the retrieved data, where the visualization represents the answer estimate. In some embodiments, visualization processor 232 may render various analytics to represent the answer estimates including, but not limited to, images, charts, tables, dashboards, maps, and the like. In some embodiments, visualization processor 232 may present the answer estimate to the user.

In some embodiments, feedback handler 234 may be a computer module that processes feedback from users on answer estimates generated by answer generator 228. In some embodiments, users may be engaged in dialog with the QA system 212 to evaluate the relevance of received answer estimates. Answer generator 228 may produce a list of answers (e.g., answer estimates) corresponding to a question submitted by a user. The user may rank each answer estimate according to its relevance to the question. In some embodiments, the feedback of users on generated answer estimates may be used for future question answering sessions.

In some embodiments, the observation module 242 may provide various associations and/or patterns regarding given answer estimates. For example, an observation module 242 may determine that a first group of people exhibit an affinity towards literature. The observation module 242 is described further below.

The various components of the exemplary question answering system described above may be used to implement various aspects of the present disclosure. For example, the client application 208 could be used to receive an input question from a user. The question analyzer 214 could, in some embodiments, be used to analyze the input question and to identify a demographic context of the question. Further, the query processor 230 or the answer generator 228 could, in some embodiments, be used to determine an answer estimate and calculate confidence scores for the answer estimates.

Figure 3:
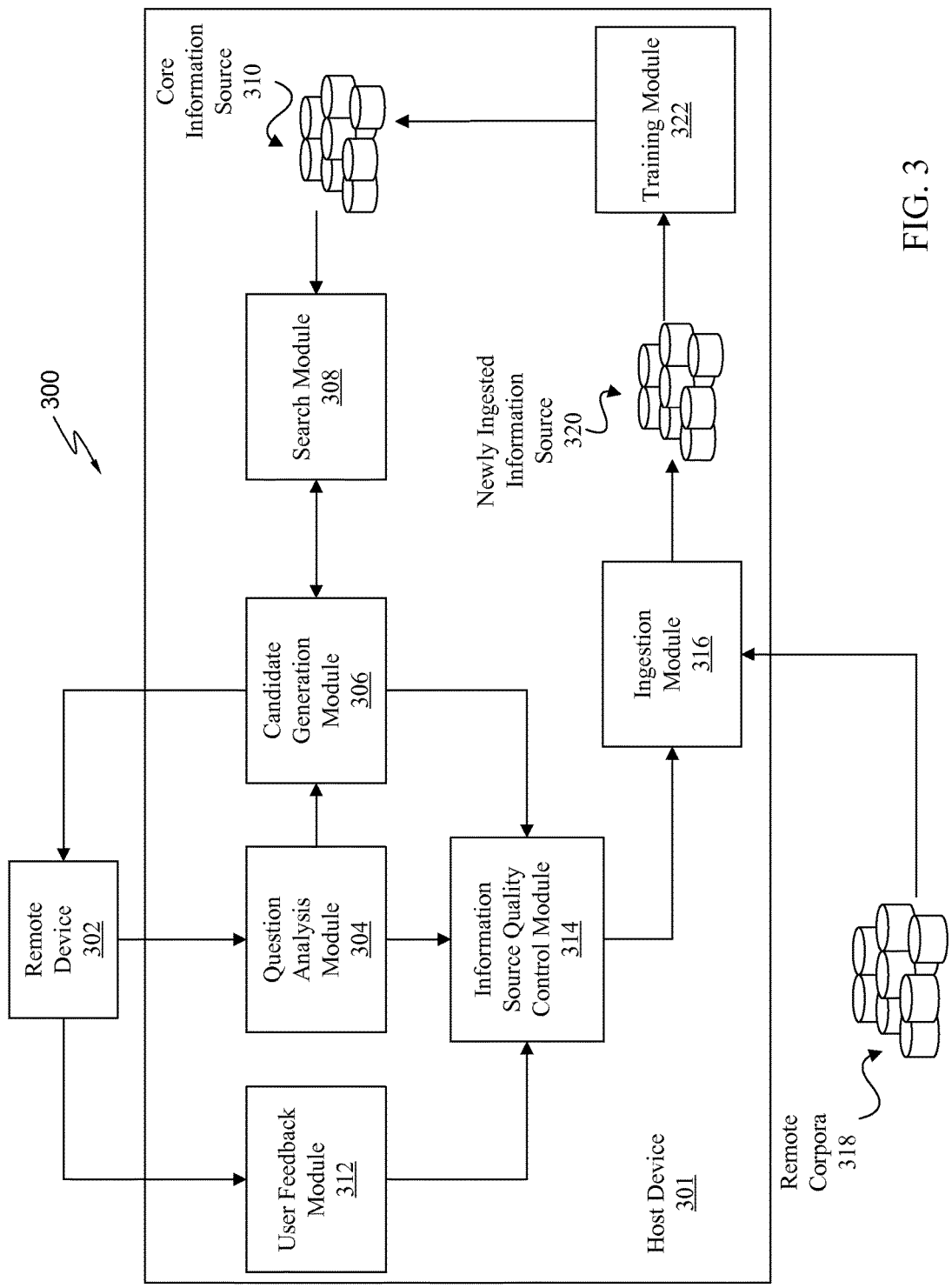
FIG. 3 illustrates a block diagram of an example high level logical architecture of a QA system, consistent with embodiments the present disclosure.

FIG. 3 illustrates a block diagram of an example high level logical architecture of a QA system, consistent with embodiments of the present disclosure. Aspects of FIG. 3 are directed toward components and modules for use with a QA system 300. In some embodiments, host device 301 and remote device 302 may be embodied by host device 122 and remote device 102 of FIG. 1, respectively. In some embodiments, the question analysis module 304, located on host device 301, may receive a natural language question (e.g., a question) from a remote device 302, and can analyze the question to produce information about the question based on the question's content and context (e.g., demographic traits). This may be accomplished, for example, by using components 216, 218, 220, 222, and 240 of FIG. 2. The information produced by question analysis module 304 may include, for example, the semantic type of the expected answer.

Next, the candidate generation module 306 may formulate queries from the output of the question analysis module 304 and then pass these queries on to search module 308 which may consult various resources (e.g., social media portals, blogs, books, studies, etc.) to retrieve documents that are relevant to answering the user question. As used herein, documents may refer to various types of written, printed, or electronic media (including passages, web-pages, database files, multimedia, etc.) that provide information or evidence. As illustrated in FIG. 3, the search module 308 may consult core information source 310. As used herein, a core information source may refer to any document or group of documents that is used by a relevant QA system to generate answer estimates to user questions. The candidate generation module 306 may extract, from the search results obtained by search module 308, potential answers (e.g., answer estimates) to the question, which it may then score (e.g., with confidence scores) and rank. A final answer estimate, based on a comparison of various confidence scores associated with the answer estimates, may then be sent from the candidate generation module 306 to remote device 302 for presentation to the user. In addition, this information about answer estimates and confidence scores may also be sent to information source quality control module 314. A user may respond, via remote device 302, to the answer estimates (for example, by indicating that none of the provided answer estimates are accurate or relevant) through user feedback module 312. The user feedback module 312 may then provide this feedback to the information source quality control module 314.

In some embodiments, the information source quality control module 314 may compile and analyze information that it receives during the course of normal operations of question and answering system 300. This received information (e.g., information from question analysis module 304, candidate generation module 306, and user feedback module 312) may be usable by the information source quality control module 314 to determine whether one or more new information sources should be ingested. When the information source quality control module 314 determines that a new information source having certain characteristics is needed (e.g., an information source that is associated with a specific question category), it may instruct an ingestion module 316 accordingly. Based on these instructions, ingestion module 316 may search one or more remote sources, such as remote corpora 318, in an attempt to locate one or more suitable new information sources. In some embodiments, once discovered, these new information sources may be ingested by ingestion module 316 and become newly ingested information source 320. This information source may in turn be analyzed by training module 322. This training analysis may take the form of obtaining training potential correct answers to training questions using the newly ingested information source 320 and then reviewing the quality of these training answer estimates. As used herein, training questions may refer to predetermined questions that are used by a QA system for either (1) reviewing or determining the quality or characteristics of an information source used to identify training answer estimates to these questions, (2) creating or refining machine learning models and routing paths usable by the QA system, or both. In some embodiments, once a threshold level of confidence in the new information source is met, it may be combined with core information source 310 and used to answer new input questions as they are received from users.

The various components and modules of the exemplary high level logical architecture for a QA system described above may be used to implement various aspects of the present disclosure. For example, the question analysis module 304 may, in some embodiments, be used to receive questions and demographic tags from a research user. The candidate generation module 306 and search module 308 may together, in some embodiments, be used to perform searches of core information source 310, generate answer estimates, calculate confidence scores associated with these answer estimates, and provide these answer estimates to one or more users. Further, the information source quality control module 314 may, in some embodiments, be used to analyze confidence scores and determine whether the confidence scores fail to meet one or more confidence criteria. Further, ingestion module 316 may, in some embodiments, be used to ingest new information sources (in response to an indication from the information source quality control module 314 that a confidence criteria has not been satisfied).

Figure 4:
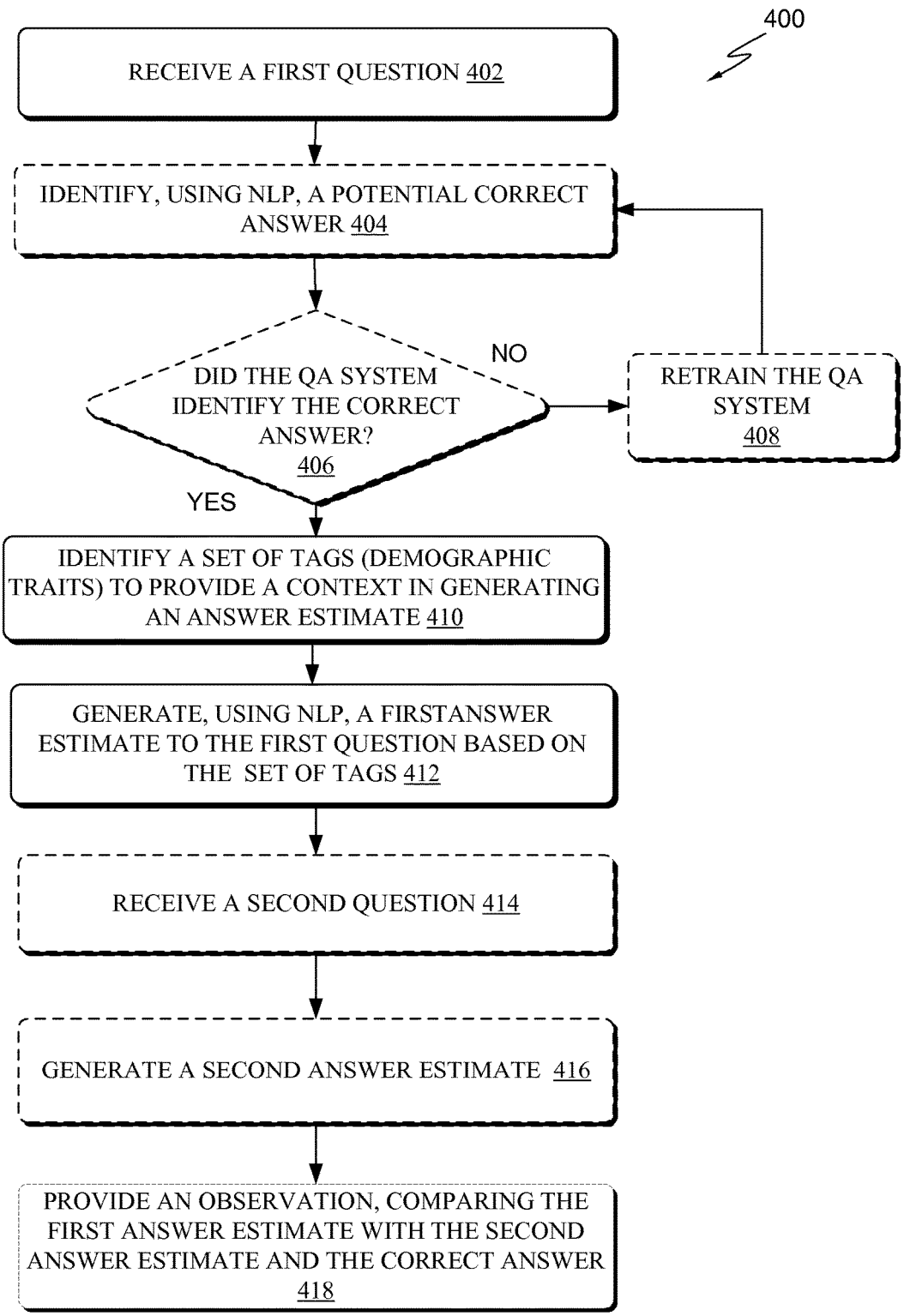
FIG. 4 is a flow diagram of an example process 400 for receiving a question and generating an answer estimate based on demographic traits, according to embodiments.

FIG. 4 is a flow diagram of an example process 400 for receiving a question and generating an answer estimate based on demographic traits, according to embodiments. In some embodiments, the process 400 may begin at block 402 when a QA system receives (e.g., is presented with) a question. The question may be any suitable question utilized by researchers or social scientists to study human learning and/or human behavior. For example, a researcher may desire to test whether individuals a particular Spanish-speaking country associates the English word "lemon" with the color green instead of associating the word lemon with the color yellow. The researcher may hypothesize that individuals having English as a second language may misconstrue "lemon" as a translation for the Spanish word "limón" which refers to a green lime. The test question may be in multiple choice form and read, "strawberry is to red as x is to y." The answer choices may be: (A) peach is to ripe, (B) leather is to brown, (C) grass is to green, (D) orange is to round, and (E) lemon is to yellow.

In various embodiments, the questions may be presented in various manners according to various formats. For example, as illustrated above, the question may be presented in multiple choice and "fill in the blank" form. Alternatively, the questions may be presented as stand-alone questions such as "who is the most influential person in your life?" Further, the questions may be presented in text only, as illustrated above. Alternatively, the questions may be presented in diagrams only or diagrams with text. Moreover, the questions may be presented in an audio format. The different formats may be useful for determining how particular people learn based on different presentations of the questions. For example, using diagrams related to a particular culture may help a child of that particular culture learn more efficiently. In another example, some individuals learn better when they hear questions, whereas others may understand and learn better when they see diagrams associated with the questions presented. The QA system may also generate an answer estimate (block 406) using text, diagrams with text, audio, etc.

Per block 404, if there is a "correct" answer to the question presented, the QA system may identify, using NLP, a potential correct answer. For example, using the illustration above, the QA system may identify answer (E) "lemon is to yellow" as the correct answer to the question of "strawberry is to red as x is to y". Per block 408, if the QA system did not identify the correct answer (block 406), then the QA system may be retrained. Consequently, more data resources may have to be fed into the information corpus. For example, as described in FIG. 3, the information source quality control module 314, the ingestion module 316, the newly ingested information source 320, and the training module 322 may all be utilized to perform block 408. In some embodiments, a user may input the correct answer to the QA system in block 408 such that the QA system may keep possession of the correct answer for future questions. In some embodiments, once the QA system is retrained per block 408, block 404 and 406 may be repeated until the QA system identifies the correct answer.

Per block 410, and in some embodiments, if the QA system identifies the correct answer, the QA system may identify a set of tags corresponding to a set of demographic traits for use in providing a context to generate a first answer estimate to the first question. In some embodiments, the user may request the tags by selecting the tags as part of a GUI of the QA system to provide a context to the question. In other embodiments, the user may provide the tags as part of the question. For example, the user may ask "what are five year-old-boys' and five-year-old girls' highest priorities in life?" Accordingly, the QA system may identify the tags as "five-year-old boys" and "five-year-old girls". Using the illustration above, a researcher may be interested to see how people of different ages and different cultures will answer the question "strawberry is to red as x is to y." The set of demographic traits may be "age 5" and "age 20" (age tags) and "English-Speaking country X" and "Spanish-Speaking country Y" (region tags). Various demographic traits may be utilized to provide a context to the questions such as age, political ideology, race, gender, religion, etc. In some embodiments, the researcher or user may specify the demographic tags or traits to the QA system and the QA system will identify and analyze the demographic tags (e.g., via the demographic tag identifier 240 of FIG. 2), and further provide an answer estimate based on the demographic tags.

At block 412, the QA system may generate, using NLP, a first answer estimate to the first question based on the set of demographic tags. The answer estimate may be based on storing various studies, books, audio media, or other data sources to an information corpus (e.g., Information Corpus 226 of FIG. 2), and utilizing NLP, as described herein, to generate an answer estimate based on reading the stored data in the information corpus, as described above. Using the illustration above, the answer estimates for the question "strawberry is to red as x is to y" may be as follows as specified by the chart below:

| Answer Estimates | | |
|---|---|---|
| | country X | country Y |
| 5-year-olds | E ("lemon is to yellow") | C ("grass is to green") |
| 20-year-olds | E ("lemon is to yellow") | E ("lemon is to yellow") |

Accordingly, for example, the QA system may predict country X's 5-year-olds will have likely answered the question, "strawberry is to red as x is to y" by selecting multiple choice E "lemon is to yellow" (the correct answer). Moreover, country X's 20-year olds, and country Y's 20-year-olds may have also answered the question with the correct answer of "lemon is to yellow." However, the QA system may predict that country Y's 5-year-olds will also likely answer the first question with the answer choice C "grass is to green." This chart may be utilized to provide an observation (e.g., block 418). For example, the QA system may identify that the country Y's five-year-olds were less likely to answer the first question correctly. The QA system (or user) may also identify various explanations for this. For example, in Latin America, the word "limón" may mean lime and therefore be equated to the color "green." Accordingly, when a 5-year-old child from the Latin American country sees answer (E) "lemon is to yellow," he or she may equate "lemon" to "limón" and think that the answer should include "green" instead of "yellow."

Per block 414, the QA system may receive a second question. The second question may be for use in assessing how the QA system (or people) learn according to the different questions asked. For example, a researcher may be interested in how children learn math. The QA system may receive a first question (e.g., block 402) that reads "Team A kicked 7 field goals and team B kicked 4 field goals. How many points did team A win by?" A researcher may then specify to the QA system the demographic tag of gender. In order to answer the first question correctly, the assumption is that the subject answering the question knows how much field goals are worth, which is 3 points. The correct answer is 9 points (3+3+3=9). However, if one was not knowledgeable in American football, or field goals, he or she may assume that a field goal is only worth one point and therefore provide an answer of 3 (1+1+1=3). Accordingly, a user may ask the QA system the first question, and with the gender demographic tag identified (block 410), the QA system may provide an answer estimate (block 412) to estimate whether more girls than boys or vice versa would answer the answer correctly.

In order to provide a more complete observation, the researcher may provide and the QA system may receive, per block 414, a second question. The second question may identify additional information (e.g., an assumption) that the first question did not provide so that the researcher or QA system can make a stronger observation inference. For example, using the illustration above, the second question may be: "Team A kicked 7 field goals and team B kicked 4 field goals. A field goal is worth 3 points in American Football. How many points did team A win by?" The additional information or assumption, which is that a field goal is worth 3 points, is clearly specified in the second question. Therefore, for example, if a researcher observed that there was a significant difference in how either boys or girls answered the first questions, but no significant difference once the assumption was provided, an inference may be made that the boys or girls were not simply adding incorrectly. Instead, an inference may be made that at least one of the gender groups is unfamiliar with American football or how much field goals are worth, given the assumption that was specified in the second question. This sort of observation may be useful, for example, for a math teacher of all boys or all girls who is curious whether math questions associated with particular topics help the particular students learn better or worse.

Per block 416, the QA system may generate a second answer estimate. For example, using the illustration above, the QA system may estimate the percentage of boys versus girls who would answer the second question correctly (e.g., "80% of girls would get the correct answer (9)"). Alternatively, the QA system may give a free-standing answer estimate to the question along with a confidence score. For example, the answer estimate for girls may be: "9 (CI= 95%)".

Per block 418, the QA system (or user) may make an observation (e.g., via the observation module 242 of FIG. 2), comparing the first answer estimate with the second answer estimate and the set of correct answers. As discussed in the illustration above, the QA system may identify significant statistical difference in how boys answered the first question compared to the girls with respect to the first question only, whereas the answer estimate of the second question may not elicit a significant difference. Accordingly, the observation may be provided that either girls or boys are not as familiar with American football or field goal scoring. Using this illustration, the QA system may make an observation that after adding the additional information (e.g., the assumption) in the second question, there was no statistical difference between answer estimates of the first and second question.

FIG. 5 is an example screen shot of a QA system question and demographic-based answer estimates, according to embodiments. In this example screen shot, a researcher or other user may input a question such as "what is your highest priority in life?" In some embodiments, as illustrated in FIG. 5, there are no "correct" answers, so the QA system may bypass identifying a correct answer (e.g., block 404 of FIG. 4). Instead, the user may specify the particular tags or demographic traits that he or she wants to be identified to provide a context to answer the question. In FIG. 5, the desired tags may be "age" and "location." Accordingly, the answer to the question of "what is your highest priority in life?" may be answered as follows: four-year-olds—toys, 12-year-olds—video games, 17-year-olds—friends, 30-year-old Midwestern—family, 30-year-old West Coast—career and relationships, 30-year-old Southern—family and faith. In some embodiments, the QA system answers may have confidence values placed next to the answers to give the researcher an idea of probability that a particular person would give a particular answer based on the corpus of information available. One "observation" (e.g., provided via the observation module 242 of FIG. 2) may be that priorities are people-based starting at age 17 (e.g., friends, relationships, and family), whereas 4-year-olds and 12-year-olds have priorities regarding tangible items such as toys and video games. Another observation may be that a 30-year-old West Coast person mat have statistically different priorities than either the 30-year-old Midwestern person or the 30-year-old Southern person. The QA system of FIG. 5 may be useful, for example, when someone is running for a political office or marketing a particular brand and is trying to tailor the brand or a political message to the priorities of communities. Moreover, FIG. 5 may be useful for determining how to develop learning curriculums based on priorities and regions.

FIG. 6 is an example of a particular question that may be fed to the QA system, according to embodiments. The question may be: "Germs are . . . ". The possible multiple choice selections may be: (A) "a yummy snack," (B) "organisms that are so small they can only be seen by a microscope," (C) "bugs," or (D) "a vegetable." In some embodiments, as illustrated in FIG. 6, there may be a "correct" answer, which is (B) "organisms that are so small they can only be seen by a microscope." As described above, the QA system may be trained until it gives the correct answer. In some embodiments, after successful training, various demographic traits may be identified to provide answer estimates to the question. For example, in FIG. 6, demographic traits of "age" and "gender" may be analyzed to generate a context of the question. Accordingly, answer selections (A), (B), (C), and (D) may each include associated data describing the percentage or number of people by age and gender that would select each of the selections according to the QA system's information corpus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating an answer estimate to a question based on demographic traits, the method comprising:
   identifying that a user has selected a first tag and a second tag, wherein the user selects the first tag and the second tag from a plurality of demographic trait tags displayed within a graphical user interface (GUI), the first tag corresponding to a first demographic trait and the second tag corresponding to a second demographic trait, and wherein the first tag and the second tag provide a context for generating a first answer estimate to a first question;
   receiving the first question, wherein the first question is displayed on the GUI with the plurality of selections, and wherein the first question is presented in each of a text format, a diagrams with no text format, a diagrams with text format, and an audio format; and
   generating, using natural language processing and based on the first tag and the second tag, the first answer estimate to the first question, wherein the first answer estimate is generated according to the first and second demographic traits, and the first answer estimate provides associated data for each of the plurality of selections.

2. The method of claim 1, further comprising providing, in response to receiving the first question, a first correct answer, the first correct answer for use in comparing the first correct answer to the first answer estimate in order to make an observation, the observation includes a QA computing system making statistical inferences between answer estimates.

3. The method of claim 1, further comprising:
   receiving a second question;
   identifying that the first question and the second question has a same correct answer; and
   generating, using natural language processing and based on identifying the first tag, a second answer estimate to the second question.

4. The method of claim 3, comprising:
   determining, by comparing the first answer estimate with the correct answer, that the first answer estimate does not match the correct answer;
   determining, by comparing the second answer estimate with the correct answer, that the second answer estimate matches the correct answer; and
   providing an observation, wherein the observation identifies an association between at least two of a group consisting of: the first question, the first answer estimate, the first tag, the correct answer, the second question, and the second answer estimate.

5. The method of claim 1, further comprising providing, in response to the generating the first answer estimate, an observation, wherein the observation identifies one or more associations between at least two of a group consisting of: the first question, the first tag, and the first answer estimate.

6. The method of claim 1, wherein the identifying of the first tag is in response to a user selection of the first tag, the method further comprising:
   providing, in response to receiving the first question, a correct answer to the first question;
   receiving a second question, wherein the second question includes the first question, the second question further including additional information that the first question does not include;
   determining that the second question is associated with the correct answer;
   generating, using natural language processing and based on identifying the first tag, a second answer estimate to the second question;
   determining, by comparing the first answer estimate with the correct answer, that the first answer estimate does not match the correct answer;
   determining, by comparing the second answer estimate with the correct answer, that the second answer estimate matches the correct answer; and
   providing an observation, wherein the observation identifies that after adding the additional information in the second question, the second answer estimate matches the correct answer.

7. A system for generating an answer estimate to a question based on demographic traits, the system comprising:
   a memory;
   at least one processor circuit in communication with the memory, wherein the at least one processor circuit is configured to perform a method, the method comprising:

identifying that a user has selected a first tag and a second tag, wherein the user selects the first tag and the second tag from a plurality of demographic trait tags within a graphical user interface (GUI), the first tag corresponding to a first demographic trait and the second tag corresponding to a second demographic trait, and wherein the first tag and the second tag provide a context for generating a first answer estimate to a first question;

receiving a first question, wherein the first question is displayed on the GUI with the plurality of selections, and wherein the first question is presented in each of a text format, a diagrams with no text format, a diagrams with text format, and an audio format; and generating, using natural language processing and based on the first tag and the second tag, the first answer estimate to the first question, wherein the first answer estimate is generated according to the first and second demographic traits, and the first answer estimate provides associated data for each of the plurality of selections.

8. The system of claim 7, wherein the method further comprises:

providing, in response to receiving the first question, a first correct answer, the first correct answer for use in comparing the first correct answer to the first answer estimate in order to make an observation.

9. The system of claim 7, wherein the method further comprises:

receiving a second question;

associating the first question and the second question with a same correct answer;

generating, using natural language processing and based on identifying the plurality of tags, a second answer estimate to the second question;

determining, by comparing the first answer estimate with the correct answer, that the first answer estimate does not match the correct answer;

determining, by comparing the second answer estimate with the correct answer, that the second answer estimate matches the correct answer; and providing an observation, wherein the observation identifies an association between at least two of a group consisting of: the first question, the first answer estimate, the plurality of tags, the correct answer, the second question, and the second answer estimate.

10. The system of claim 9, further comprising:

determining that the first and second answer estimates are different based on the observation; and generating, using the natural language processing and based on the determining that the first and second answer estimates are different, a second observation, the second observation making statistical inferences associated with the first and second answer estimates.

11. A computer program product comprising a computer readable storage medium having program instructions embodied therewith, the program instructions executable by a computer to cause the computer to perform a method, the method comprising:

identifying that a user has selected a first tag and a second tag, wherein the user selects the first tag and the second tag from a plurality of demographic trait tags displayed within a graphical user interface (GUI), the first tag corresponding to a first demographic trait and the second tag corresponding to a second demographic trait, and wherein the first tag and the second tag provide a context for generating a first answer estimate to a first question;

receiving a first question, wherein the first question is displayed on the GUI with the plurality of selections, and wherein the first question is presented in each of a text format, a diagrams with no text format, a diagrams with text format, and an audio format;

identifying, using natural language processing, an answer to the first question;

determining that the answer is incorrect;

training, in response to the determining that the answer is incorrect, a training module until the first question is answered correctly;

generating, using the natural language processing and based on the first tag and the second tag, the first answer estimate to the first question, wherein the first answer estimate is generated according to the first and second demographic traits, and the first answer estimate provides associated data for each of the plurality of selections.

12. The computer program product of claim 11, wherein the method further comprises: providing, in response to the generating the first answer estimate, an observation, wherein the observation identifies one or more associations between at least two of a group consisting of: the first question, the first tag, and the first answer estimate.

13. The computer program product of claim 11, wherein the first answer estimate is presented in at least one of the following formats: text, diagrams, diagrams with text, or audio.

14. The program product of claim 11, wherein the identifying of the first tag is in response to a user selection of the first tag, the method further comprising:

providing, in response to receiving the first question, a correct answer to the first question;

receiving a second question, wherein the second question includes the first question, the second question further including additional information that the first question does not include;

determining that the second question is associated with the correct answer;

generating, using natural language processing and based on identifying the first tag, a second answer estimate to the second question;

determining, by comparing the first answer estimate with the correct answer, that the first answer estimate does not match the correct answer;

determining, by comparing the second answer estimate with the correct answer, that the second answer estimate matches the correct answer; and providing an observation, wherein the observation identifies that after adding the additional information in the second question, the second answer estimate matches the correct answer.

* * * * *